US006364016B1

(12) United States Patent
Dalrymple et al.

(10) Patent No.: US 6,364,016 B1
(45) Date of Patent: Apr. 2, 2002

(54) METHODS OF REDUCING THE WATER PERMEABILITY OF SUBTERRANEAN FORMATIONS

(75) Inventors: Eldon D. Dalrymple; Larry S. Eoff; Baireddy R. Reddy, all of Duncan; David L. Brown, Temple; Paul S. Brown, Duncan, all of OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/697,060

(22) Filed: Oct. 26, 2000

(51) Int. Cl.$^7$ ................................................ E21B 43/22
(52) U.S. Cl. .................... 166/270; 166/270.1; 166/300
(58) Field of Search ........................... 166/268, 270, 166/270.1, 400, 401, 300, 305.1

(56) References Cited

U.S. PATENT DOCUMENTS

| | | | |
|---|---|---|---|
| 4,425,966 A | * | 1/1984 | Brown et al. ............... 166/295 |
| 4,532,052 A | * | 7/1985 | Weaver et al. .......... 166/275 X |
| 4,730,028 A | | 3/1988 | Bock et al. |
| 4,858,693 A | * | 8/1989 | Navratil et al. ............. 166/295 |
| 5,071,934 A | | 12/1991 | Peiffer |
| 5,146,986 A | | 9/1992 | Dalrymple |
| 5,701,956 A | * | 12/1997 | Hardy et al. ................ 166/295 |
| 6,228,812 B1 | * | 5/2001 | Dawson et al. ............. 507/221 |

FOREIGN PATENT DOCUMENTS

| | | |
|---|---|---|
| WO | WO 99/49183 | 9/1999 |
| WO | WO 99/50530 | 10/1999 |

* cited by examiner

*Primary Examiner*—Frank S. Tsay
(74) *Attorney, Agent, or Firm*—Robert A. Kent; C. Clark Dougherty, Jr.

(57) ABSTRACT

Improved methods of treating water and hydrocarbons producing subterranean formations to reduce the water permeabilities of the formations without substantially reducing the hydrocarbons permeabilities thereof are provided. The methods basically comprise introducing into the formation a chemical which does not resist water flow and attaches to adsorption sites on surfaces within the porosity of the formation but slowly washes off the sites as another fluid flows through the treated formation. Thereafter, a water flow resisting polymer is introduced into the formation so that it flows deeply into the porosity of the formation before the previously introduced chemical washes off and attaches to the adsorption sites as the chemical washes off.

22 Claims, No Drawings

METHODS OF REDUCING THE WATER PERMEABILITY OF SUBTERRANEAN FORMATIONS

BACKGROUND OF THE INVENTION

1. Field of the Invention

The present invention relates generally to methods of reducing the water permeability of water and hydrocarbons producing subterranean formations, and more particularly, to methods of reducing the water produced from such formations without appreciably reducing the hydrocarbons produced therefrom.

2. Description of the Prior Art

Many hydrocarbon wells produce high amounts of water along with the hydrocarbons. For example, eighty percent or more of the total fluids produced can be and often is water. This simultaneous production of water with hydrocarbons constitutes a major expense in the recovery of the hydrocarbons from subterranean producing formations. The expense includes the energy expended in producing the water, and thereafter, separating the water from the produced hydrocarbons and disposing of the water.

A variety of methods and techniques have heretofore been utilized which achieve varying degrees of success in reducing the water permeability of subterranean formations. For example, U.S. Pat. No. 5,146,986 issued to Dalrymple on Sept. 15, 1992 discloses a method of reducing the water produced from a subterranean formation without substantially reducing the oil produced therefrom. In accordance with that method, the formation is contacted with a hydrocarbon treating solution having dissolved therein a surface active agent formed of one or more fatty acid imidazolyl compounds.

Another more recent method of reducing the water permeability of water and hydrocarbons producing formations involves the introduction of a water flow resisting polymer into the formation to reduce the water permeability thereof without substantially reducing the hydrocarbons permeability thereof. While this method has achieved success, a problem which has been encountered is that the polymer can only be injected into the formation a short distance from the well bore. That is, the water flow resisting polymer attaches to adsorption sites on surfaces within the porosity of the formation as it flows from the well bore. Once the polymer is adsorbed onto the surfaces in the formation near the well bore, its presence interferes with and blocks the flow of additional polymer into the formation. This results in limited polymer penetration into the formation and the water producing zone or zones therein which limits the reduction in water production achieved.

Thus, there is a need for improved methods of utilizing water flow resisting polymers to reduce the water permeabilities of producing formations without substantially reducing the hydrocarbons permeabilities thereof.

SUMMARY OF THE INVENTION

The present invention provides improved methods of reducing the water permeability of a subterranean formation without substantially reducing the hydrocarbons permeability which meets the above described need and overcomes the deficiencies of the prior art. In accordance with the improved methods, a chemical which does not resist water flow and attaches to adsorption sites on surfaces within the porosity of the formation but slowly washes off is introduced into the formation. After the chemical has been adsorbed on surfaces within the formation, a water flow resisting polymer is introduced into the formation. As the water flow resisting polymer flows through the formation, it is not initially adsorbed onto the surfaces of the formation due to the presence of the previously adsorbed chemical. As a result, the water flow resisting polymer is pumped from the well bore for long distances into the formation before the chemical washes off the surfaces and allows the polymer to take its place. That is, as the chemical washes off, the water flow resisting polymer is adsorbed onto the formation surfaces resulting in the continuous coating of the formation surfaces from the well bore to long distances away from the well bore.

A preferred method of this invention is comprised of the following steps. A chemical that does not resist water flow, attaches to adsorption sites on surfaces within the porosity of the formation and slowly washes off when another fluid is introduced into the formation is pumped into the formation. A water flow resisting polymer is pumped into the formation so that it flows deeply into the porosity of the formation before the previously adsorbed chemical washes off and the water flow resisting polymer attaches to the adsorption sites as the previously adsorbed chemical washes off. Thereafter, a salt water overflush is pumped into the formation so that excess water flow resisting polymer is displaced more deeply into the formation. Finally, a hydrocarbon liquid (or a gas when a hydrocarbon gas producing zone is being treated) is pumped into the formation to contact the surfaces in the formation.

Thus, it is a general object of the present invention to provide improved methods of reducing the water permeabilities of subterranean water and hydrocarbons producing formations without substantially reducing the hydrocarbon permeabilities thereof.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods of reducing the water produced from a subterranean formation penetrated by a well bore without substantially reducing hydrocarbons produced therefrom. The improved methods can be utilized in formations formed from various materials such as sandstone, limestone, dolomite and the like and are relatively simple to carry out.

As mentioned, it has recently been found that various water flow resisting polymers can be utilized to reduce the permeabilities of subterranean formations with respect to water without substantially reducing the permeabilities with respect to hydrocarbons. Such polymers which are sometimes referred to as relative permeability modifiers have been dissolved in water and pumped into subterranean formations which produce water and hydrocarbons. The polymers readily attach to adsorption sites on surfaces within the porosities of the formations, but the adsorbed polymers near the well bore interfere with and prevent the polymer from moving very far into the formation. This, in turn, limits the effectiveness of the polymer in reducing the production of water along with hydrocarbons into the well bore.

The improved methods of this invention for treating a water and hydrocarbon liquid and/or gas producing subterranean formation are comprised of the steps of: (a) introducing into said formation a chemical which does not resist water flow and attaches to adsorption sites on surfaces within the porosity of the formation but slowly washes off the sites as another liquid flows through the treated formation, and then (b) introducing into the formation a polymer which functions as a relative permeability modifier, i.e., restricts the water flow through a subterranean formation without substantially reducing the hydrocarbons flow, is introduced into the formation so that it flows deeply into the porosity of the formation before the chemical previously adsorbed washes off and the polymer attaches to the adsorption sites in the formation as the chemical washes off. The methods preferably also include the step of (c) introducing fresh water or salt water, most preferably salt water containing a calcium salt, e.g., 1% to 5% calcium chloride, into the formation after the water flow resisting polymer has been introduced therein whereby excess polymer is displaced more deeply into the formation, and the further step of (d) introducing a hydrocarbon liquid or a gas into the formation to contact the surfaces therein whereby hydrocarbon liquid and/or gas more readily flows through the formation into the well bore.

A variety of chemicals which do not resist water flow, attach to adsorption sites on surfaces within the porosities of subterranean formations and slowly wash off the sites as another fluid flows through the formations can be utilized in accordance with the present invention, i.e., in accordance with step (a) described above. It is believed that any chemical, the adsorption of which is kinetically more favored but thermodynamically less favored relative to the water flow resisting polymer, is suitable. Examples of such chemicals include, but are not limited to, tetramethylammonium salts such as tetramethylammonium chloride, polyvinylpyrrolidone; polyethyleneoxide; polyethyleneimine; and nonionic, amphoteric, anionic and cationic surfactants. Of these, tetramethylammonium chloride is preferred.

The chemical utilized is preferably dissolved or dispersed in a carrier liquid such as fresh water or salt water, most preferably salt water containing a calcium salt, e.g., 1% to 5% by weight calcium chloride, prior to introducing it into the formation to be treated. Generally, the chemical is included in the carrier liquid in an amount in the range of from about 0.01% to about 10.0% by weight of the carrier liquid, more preferably in an amount of from about 0.1% to about 1.0%.

The water flow resisting polymer utilized in step (b) described above can be one of a variety of polymers. Examples of particularly suitable polymers include, but are not limited to, polyacrylamide, hydrolyzed polyacrylamide, xanthan, scleroglucan, polysaccharides, amphoteric polymers made from acrylamide, acrylic acid, and diallyldimethylammonium chloride, vinyl sulfonate/vinyl amide/acrylamide terpolymers, vinyl sulfonate/acrylamide copolymers, acrylamide/acrylamido-methylpropanesulfonic acid copolymers, acrylamide/vinylpyrrolidone copolymers, sodium carboxymethyl cellulose and poly[dialkylaminoacrylate-co-acrylate-g-poly(ethyleneoxide)]. Of these, poly[dialkyl-aminoacrylate-co-acrylate-g-poly(ethyleneoxide)] is most preferred. As used herein "-g-" in a formula means that the immediately following molecule in the formula is grafted to the preceeding polymer molecule.

The water flow resisting polymer utilized is preferably dissolved in an aqueous carrier liquid such as fresh water or salt water most preferably salt water containing a calcium salt, e.g., 1% to 5% by weight calcium chloride. Generally, the water flow resisting polymer is included in the aqueous carrier liquid in an amount in the range of from about 0.01% to about 10.0% by weight of the aqueous carrier liquid, more preferably in an amount of from about 0. 1% to about 1.0%.

As mentioned above, steps (c) and (d) described above are preferably performed after steps (a) and (b). Step (c) comprises the introduction of additional salt water into the formation whereby excess water flow resisting polymer therein is displaced more deeply into the formation. Step (d) comprises the introduction of a hydrocarbon liquid or a gas into the formation to contact the surfaces therein. Step (d) converts the saturation phase in the formation from water to a hydrocarbon liquid or a gas saturation phase, which helps re-establish hydrocarbon liquid or gas permeability of the formation. When the hydrocarbons produced from the formation being treated are liquid hydrocarbons, e.g., oil, the hydrocarbon liquid introduced into the formation is preferably selected from the group of kerosene, diesel oil or crude oil, with kerosene being most preferred. When the hydrocarbons produced by the formation are gaseous hydrocarbons, a gas is introduced into the formation such as methane, natural gas or an inert gas such as nitrogen. Of these, nitrogen is preferred.

While the quantities of the salt water introduced in accordance with step (c) and the hydrocarbon liquid or a gas introduced in accordance with step (d) will vary depending upon the particular formation being treated, such quantities can range from 25% to 200% of the volume of the treating fluids introduced in accordance with step (b) to displace the water flow resisting polymer more deeply through the formation and to aid in restoring the original hydrocarbon permeability of the formation.

Upon completion of the treatment of a water and hydrocarbon producing formation in accordance with this invention, the formation is returned to production. As a result of the treatment, the flow of water through the formation is significantly reduced while the flow of hydrocarbons through the formation is essentially unchanged or increased.

A preferred method of the present invention for reducing the water permeability of a formation without substantially reducing the hydrocarbons permeability thereof is comprised of the following steps: (a) introducing into the formation a chemical which does not resist water flow and attaches to adsorption sites on surfaces within the porosity of a formation but slowly washes off the surfaces and adsorption sites as another fluid flows through the formation, the chemical being selected from the group consisting of tetramethylammonium salts, polyvinylpyrrolidone, polyethyleneoxide, polyethyleneimine and nonionic, amphoteric, anionic, and cationic surfactants; (b) introducing into the formation a water flow resisting polymer so that it flows deeply into the porosity of the formation before the previously adsorbed chemical washes off and attaches to the adsorption sites as the chemical washes off; (c) introducing salt water into the formation whereby excess water flow resisting polymer therein is displaced more deeply into the formation; and (d) introducing a hydrocarbon liquid or a gas into the formation to re-establish the oil or gas saturation of the formation.

A particularly preferred method of the present invention is comprised of the following steps: (a) pumping into the formation by way of the well bore a chemical which does not resist water flow and attaches to adsorption sites on surfaces within the porosity of the formation, but slowly washes off the sites as another fluid flows through the formation, the chemical being tetramethylammonium chloride dissolved or dispersed in a calcium chloride salt water carrier fluid in an amount in the range of from about 0.1% to about 1.0% by weight of the carrier fluid; (b) pumping into the formation a water flow resisting polymer so that it flows deeply into the porosity of the formation before the chemical which does not resist water flow introduced in accordance with step (a) washes off and so that the polymer attaches to the adsorption sites vacated by the chemical which does not resist water flow, the water flow resisting polymer being poly[dialkylaminoacrylate-co-acrylate-g-poly(ethyleneoxide)] which is dissolved in an aqueous calcium chloride salt water carrier fluid in an amount in the range of from about 0.1% to about 1.0% by weight of the aqueous carrier fluid; (c) pumping salt water into the formation by way of the well bore whereby excess water flow resisting polymer therein is displaced more deeply into the formation; and (d) pumping a hydrocarbon liquid or a gas into the formation by way of the well bore which is the same phase as the hydrocarbons produced by the formation to re-establish the initial saturation of the formation.

In order to further illustrate the methods of the present invention, the following example is given.

EXAMPLE

Testing was conducted using a multipressure tap Hassler sleeve containing a Berea sandstone core. The multi-tap Hassler sleeve allowed the core to be divided into four segments. In the tests, the normal flow direction was from segment 1 through segment 4 with the treatment flow being from segment 4 through segment 1. Only segments 2 and 3 of the core were compared regarding treatment penetration, reduction of water permeability and regained oil permeability. Since the preflushes, polymer treatments and overflushes entered the core by way of segment 4, it was used as an indication of potential face plugging by the polymer treatments.

Single-Core Flow Tests with a Multi-Tap Flow Cell

The laboratory evaluation procedure for the single-core water flow resisting polymer studies at 100% water saturation is described below. The single core test at 100% water saturation represents a section of the reservoir that does not contain hydrocarbons.

1. Record the test-core dimensions and place the core in the multipressure tap Hassler sleeve apparatus. Place sufficient overburden pressure on the test core to ensure that no fluid bypasses the core. (Generally an overburden pressure of 450–500 psi over the treatment pressure is used for this purpose.)

2. Determine water viscosity at the temperature that will be used in the flow tests.

3. Stabilize water flow through the core in the normal flow direction. The permeability of the core calculated at this stage is termed "base permeability."

4. Pump the polymer treatment through the core in the reverse flow direction.

5. Repeat Step 3 until stable rate and pressure are achieved to determine treated permeability.

Cores Nos. 1–5 were utilized in accordance with the above described single-core flow tests described above. The polymer used in the tests was poly[dialkylaminoacrylate-co-acrylate-g-poly(ethyleneoxide)]. The results of the tests are given in Table I below.

TABLE I

Berea Sandstone Core Tests

| Core No. | Length, cm | Diameter, cm | Temperature, °F. | Aqueous Preflush Solution/ Concentration (PPM) | Overflush | Initial Ave. Permeability, md | % Permeability Reduction in Segment 3 | % Permeability Reduction in Segment 2 |
|---|---|---|---|---|---|---|---|---|
| 1 | 15.08 | 2.53 | 175 | None | Water | 180 | 60 | 20 |
| 2 | 15.18 | 2.53 | 175 | $CaCl_2$/10,000 | Water | 273 | 45 | 45 |
| 3 | 15 | 2.53 | 175 | PEO[1]/500 | Water | 195 | 66 | 5 |
| 4 | 15.15 | 2.53 | 175 | TMAC[2]/500 | Water | 256 | 40 | 60 |
| 5 | 14.9 | 2.53 | 175 | PVP[3]/500 | Water | 96 | 72 | 62 |

[1]polyethyleneoxide (molecular weight ~4500)
[2]Tetramethylammonium chloride aqueous solution
[3]polyvinylpyrrolidone (molecular weight ~360,000)

Core #1 was treated with a small quantity of polymer to ensure that complete treatment of the core would not take place. Note that although a reduction of 60% water permeability was observed in core segment 3, only a 20% reduction in water permeability occurred in core segment 2. No reduction in water permeability was observed in core segment 1 (the last to receive the polymer treatment). Cores which were preceded with a preflush as described herein prior to treatment with the water flow resisting polymer resulted in deeper penetration and impact of the polymer treatment than that shown in the control core #1. The data also shows that when the treatment is prepared using $CaCl_2$ in the mix water, the coverage of the polymer treatment is enhanced and the resulting decrease in effective water permeability is enhanced.

Laboratory Evaluation Procedure for Water Flow Resisting Polymer Flow Studies using Layered Flow Method 1. Record core dimensions and place in the Hassler sleeve apparatus.

2. Determine viscosities (at temperature) of water and oil to be used in flow tests. All flow series performed at the desired test temperature.

3. Stabilize flow of water pressure/rate through the core in the normal production direction. The water layer is to be represented by a core with a permeability of water in the range of 1 to 2 darcies.

4. The oil layer is to be represented by a core with permeability to oil (at residual water saturation) in the range of 100 to 200 md. The core is to be prepared as outlined in the procedure for the single core study.
   a) Stabilize flow of water pressure/rate through the core in the normal production direction.
   b) Stabilize the flow of oil pressure/rate through the core in the normal production direction.
   c) Repeat STEPS "a" and "b" until reproducible water permeabilities and oil permeabilities have been achieved. (Note: The water permeability and oil permeability will probably not be equal to each other . . . this is acceptable and most probably due to the effect of relative permeability at varying water saturation's). Leave the oil core in the oil phase of the cycle.
   d) Pump 25 cc preflush solution.

5. Prepare a treatment solution using the appropriate formulation.

6. Pump 1.5 pore volumes (based upon connected porosity of the water core) through the core in the reverse flow direction using a "bullhead" placement technique into both water and oil cores simultaneously.

7. Overdisplace the treatment through the cores with 100 ml of brine.

8. If appropriate, perform a secondary overdisplacement using 25 ml of kerosene.

9. Stabilize the flow of water through the water core in the normal flow direction and calculate the treated permeability.

10. Stabilize the flow of oil through the oil core in the normal flow direction and calculate the treated permeability.

Cores Nos. 6–13 were utilized in accordance with the above described tests. The polymer used in the tests was poly[dialkylaminoacrylate-co-acrylate-g-poly(ethyleneoxide)]. The results of the tests are given in Table II below.

core containing water saturation. Cores #6 and #7 show the result of no preflush or secondary oil overflush following the treatment. Note that although the water core indicated good reduction in the effective water permeability, the permeability to oil in the oil bearing core was damaged significantly in segment #3. Cores #8 and #9 indicate the use of a preflush of tetramethylammonium chloride, but again without a secondary oil overflush following the treatment. The water permeability reduction in the water bearing core was not as high as the previous parallel study, indicating that the polymer was inhibited from attaching to the rock surface because of the preflush chemical on the adsorption sites. Although core segment #2 in the oil bearing core indicated an excellent clean up, there was still significant damage in core segment #3. Cores #10 and #11 utilized a preflush of 1% $CaCl_2$ and a secondary overflush of kerosene. It can be seen by the data in Table II that the effective water permeability reduction in the water bearing core was significantly reduced while no damage to the effective oil permeability occurred in the oil bearing core.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved method of treating a water and hydrocarbons producing subterranean formation with a water flow resisting polymer to reduce the water permeability of the formation without substantially reducing the hydrocarbon permeability thereof comprising the steps of:
   (a) introducing into said formation a chemical which does not resist water flow and attaches to adsorption sites on surfaces within the porosity of said formation but slowly washes off said sites as another fluid flows through said formation; and then
   (b) introducing into said formation said water flow resisting polymer so that it flows deeply into the porosity of said formation before said chemical washes off and attaches to said adsorption sites as said chemical washes off.

TABLE II

Berea Sandstone Core Tests

| Core No. | Length, cm | Diameter, cm | Temperature, °F. | Aqueous Preflush Solution/ Concentration (PPM) | Overflush | Initial Ave. Permeability, md | % Permeability Reduction in Segment 3 | % Permeability Reduction in Segment 2 |
|---|---|---|---|---|---|---|---|---|
| 6[1] | 14.2 | 2.52 | 175 | None | Water | 1880 | 73 | 65 |
| 7[2] | 14.67 | 2.52 | 175 | None | Water | 160 | 78 | −3 |
| 8[1] | 13.9 | 2.52 | 175 | TMAC[3]/500 | Water | 2270 | 22 | 40 |
| 9[2] | 14.66 | 2.53 | 175 | TMAC[3]/500 | Water | 196 | 38 | −40 |
| 10[1] | 14.11 | 2.51 | 175 | $CaCl_2$/10,000 | Water/oil | 1850 | 74 | 84 |
| 11[2] | 14.38 | 2.51 | 175 | $CaCl_2$/10,000 | Water/oil | 180 | 0 | 0 |
| 12 | 15.18 | 2.53 | 175 | $CaCl_2$/10,000 | Water | 250 | 75 | 67 |
| 13 | 15.1 | 2.53 | 175 | None | Water | 241 | 73 | 79 |

[1]water core
[2]oil core
[3]Tetramethylammonium chloride aqueous solution
[4]kerosene Cores #6, 7, 8, 9, 10 and 11 were used to illustrate the advantage of the invention using a parallel core flow construction. Multi-pressure tap Hassler sleeves were used ore, with one core containing oil at residual water and the other 2. The method of claim 1 wherein said chemical is introduced into said formation in accordance with step (a) dissolved or dispersed in a salt water carrier fluid.

3. The method of claim 2 wherein said chemical is present in said salt water carrier fluid in an amount in the range of from about 0.01% to about 10.0% by weight of said salt water carrier fluid.

4. The method of claim 1 wherein said water flow resisting polymer is introduced into said formation in accordance with step (b) dissolved or dispersed in a salt water carrier fluid.

5. The method of claim 4 wherein said water flow resisting polymer is present in said salt water carrier fluid in an amount in the range of from about 0.01% to about 10.0% by weight of said salt water carrier fluid.

6. The method of claim 1 which further comprises the step of:

(c) introducing salt water into said formation whereby excess water flow resisting polymer therein is displaced more deeply into said formation.

7. The method of claim 6 which further comprises the step of:

(d) introducing a hydrocarbon liquid or a gas into said formation to contact said surfaces whereby hydrocarbons more readily flow through said formation.

8. The method of claim 1 wherein said chemical introduced in accordance with step (a) is selected from the group consisting of tetramethylammonium salts, polyvinylpyrrolidone, polyethyleneoxide, polyethyleneimine, and nonionic, amphoteric, anionic and cationic surfactants.

9. The method of claim 1 wherein said water flow resisting polymer introduced in accordance with step (b) is selected from the group consisting of polyacrylamide, hydrolyzed polyacrylamide, xanthan, scleroglucan, polysaccharides, amphoteric polymers made from acrylamide, acrylic acid, and diallyldimethylammonium chloride, vinyl sulfonate/vinyl amide/acrylamide terpolymers, vinyl sulfonate/acrylamide copolymers, acrylamide/acrylamido-methylpropanesulfonic acid copolymers, acrylamide/vinylpyrrolidone copolymers, sodium carboxymethyl cellulose and poly[dialkylaminoacrylate-co-acrylate-g-poly(ethyleneoxide)].

10. The method of claim 7 wherein said hydrocarbon liquid introduced into said formation to contact said surfaces in accordance with step (d) is selected from the group consisting of kerosene, diesel oil and crude oil.

11. The method of claim 7 wherein said hydrocarbons produced from said formation are gaseous hydrocarbons and said gas introduced into said formation to contact said surfaces in accordance with step (d) is selected from the group consisting of methane, natural gas and nitrogen.

12. An improved method of treating a water and hydrocarbons producing subterranean formation penetrated by a well bore with a water flow resisting polymer to reduce the water permeability thereof without substantially reducing the hydrocarbon permeability comprising the steps of:

(a) pumping into said formation by way of said well bore a chemical which does not resist water flow and attaches to adsorption sites on surfaces within the porosity of said formation but slowly washes off said sites as another fluid flows through said formation;

(b) pumping into said formation by way of said well bore said water flow resisting polymer so that it flows deeply into the porosity of said formation before said chemical washes off and attaches to said adsorption sites as said chemical washes off;

(c) pumping salt water into said formation by way of said well bore whereby excess water flow resisting polymer therein is displaced more deeply into said formation; and (d) pumping a hydrocarbon liquid or a gas into said formation by way of said well bore to contact said surfaces in said formation whereby hydrocarbons more readily flow through said formation.

13. The method of claim 12 wherein said chemical is pumped into said formation in accordance with step (a) dissolved or dispersed in a salt water carrier fluid.

14. The method of claim 13 wherein said chemical is present in said salt water carrier fluid in an amount in the range of from about 0.1% to about 1.0% by weight of said salt water carrier fluid.

15. The method of claim 12 wherein said water flow resisting polymer is pumped into said formation in accordance with step (b) dissolved and dispersed in a salt water carrier fluid.

16. The method of claim 15 wherein said water flow resisting polymer is present in said salt water carrier fluid in an amount in the range of from about 0.1% to about 1.0% by weight of said salt water carrier fluid.

17. The method of claim 12 wherein said chemical introduced in accordance with step (a) is selected from the group consisting of tetramethylammonium salts, polyvinylpyrrolidone, polyethyleneoxide, polyethyleneimine, and nonionic, amphoteric, anionic and cationic surfactants.

18. The method of claim 12 wherein said water flow resisting polymer introduced in accordance with step (b) is selected from the group consisting of polyacrylamide, hydrolyzed polyacrylamide, xanthan, scleroglucan, polysaccharides, amphoteric polymers made from acrylamide, acrylic acid, and diallyldimethylammonium chloride, vinyl sulfonate/vinyl amide/acrylamide terpolymers, vinyl sulfonate/acrylamide copolymers, acrylamide/acrylamido-methylpropanesulfonic acid copolymers, acrylamide/vinylpyrrolidone copolymers, sodium carboxymethyl cellulose and poly[dialkylaminoacrylate-co-acrylate-g-poly(ethyleneoxide)].

19. The method of claim 12 wherein said hydrocarbon liquid introduced into said formation to contact said surfaces in accordance with step (d) is kerosene.

20. The. method of claim 12 wherein said hydrocarbons produced from said formation are gaseous hydrocarbons and said gas introduced into said formation to contact said surfaces in accordance with step (d) is nitrogen.

21. The method of claim 13 wherein said chemical is tetramethylammonium chloride and is present in said salt water carrier fluid in an amount in the range of from about 0.1% to about 1.0% by weight of said salt water carrier fluid.

22. The method of claim 15 wherein said water flow resisting polymer is poly[dialkylaminoacrylate-co-acrylate-g-poly(ethyleneoxide)] and is present in said salt water carrier fluid in an amount in the range of from about 0.1% to about 1.0% by weight of said salt water carrier fluid.

* * * * *